June 21, 1960     E. M. ROTHERMEL     2,941,571
METHOD FOR MANUFACTURING FLEXIBLE CONDUITS
Filed Nov. 25, 1957
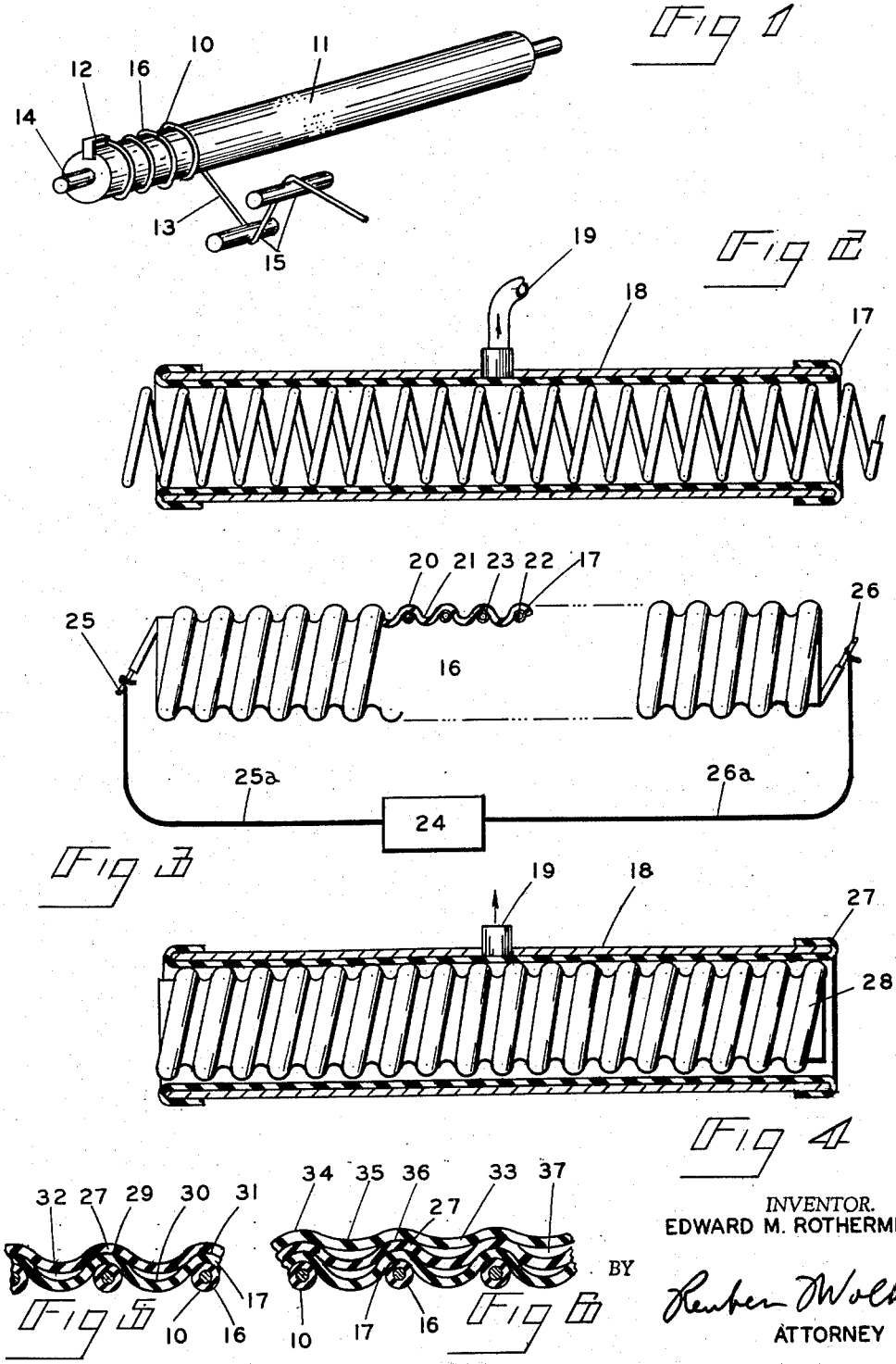
INVENTOR.
EDWARD M. ROTHERMEL
BY
ATTORNEY

United States Patent Office 2,941,571
Patented June 21, 1960

2,941,571

METHOD FOR MANUFACTURING FLEXIBLE CONDUITS

Edward M. Rothermel, Waynesville, N.C., assignor to The Dayton Rubber Company, Dayton, Ohio, a corporation of Ohio Filed Nov. 25, 1957, Ser. No. 698,773

5 Claims. (Cl. 154—8)

The present invention relates to flexible conduits and particularly to the method for manufacturing conduits which are suitable for the transmission of fluids such as are encountered in vacuum cleaners, automotive cooling systems and the like.

In all of these applications, fluid imperviousness is of course a primary consideration; and, in order to preserve this property, the conduit must have walls which will not break or tear when subjected to repeated flexing or vibration during use or when intended or abraded. At the same time, the conduit must be reinforced against radial and longitudinal stresses; and the reinforcement must be such that it will prevent collapse or restriction of the conduit passage.

In the prior art, it has been the practice to form such conduits of a rubber or plastic body having elastomeric properties and to reinforce this body with a resilient circumferential member which may also have longitudinal reinforcing effects. One such reinforcement popularly employed is a helical spring wire which has usually been embedded in the body but has more recently been positioned inwardly thereof.

While the prior art hoses so constructed have represented a substantial step forward, certain difficulties and problems have remained and have become accepted as unavoidable. For example, the very nature of a reinforcing member or coil of sufficient strength to serve its purpose, has exerted some strains and stresses upon the hose body; and the hose body, to resist these dominating influences of the reinforcing member, has had to be strengthened by increasing its thickness and forming it of more durable compounds. In all cases however, these body-strengthening expedients have made the hose less flexible and considerably heavier.

From the standpoint of economy of manufacture and to achieve a conduit of light weight and great flexibility for a given overall strength, it has recently been the practice to position the reinforcing member or coil interiorly of the body. In such cases however, the above-recited problems resulting from the use of a reinforcing member and the necessary changes in the tubular body to compensate for the same have been even more pronounced. Furthermore, even where a sufficiently durable, relatively thick tubular body is employed, the same has still been subject to being torn or ruptured with the complete and irreparable loss of fluid imperviousness.

It is accordingly an object of the present invention to provide an improved conduit for fluid transmission.

It is a further object of the present invention to provide such a conduit which will be light in weight and extremely flexible.

It is still a further object of the present invention to provide a flexible, fluid-impervious conduit wherein the tubular conduit body will be of sufficient strength and thickness to overcome the wearing and straining influences of the reinforcement but will still be light in weight and flexible.

A further object of the present invention is to provide such a conduit which will resist any breaking or tearing of the conduit wall even though such wall is entirely outwardly of the reinforcing member.

Still another object of the present invention is to provide such a conduit wherein any break or tear will not necessarily result in an immediate loss of fluid imperviousness and may be repaired before such a loss is suffered.

Still another object of the present invention is to provide a method for the manufacture of such conduits.

To achieve these and other objects and advantages of the present invention which will be apparent from a reading of the following disclosure, it is proposed to provide a conduit body wherein the entire tubular wall portion is positioned outwardly of the reinforcing member and consists of two or more separately applied thicknesses or tubular layers in the form of separate and distinct sheaths, each of which has its own peculiar relationship to the reinforcing member and to the hose assembly generally.

The reinforcing member according to the present invention may be in the form of any of the circumferential reinforcements commonly employed for flexible conduit bodies such as a helical coil or similar, generally cylindrical alignments of axially spaced circumferential turns or units. According to one preferred embodiment of the method of this invention, these units may have a center or core of an electrically-conductive, resilient material such as spring steel wire or the like which is coated or otherwise provided with an exterior surface of a plastic material.

The tubular layers or sheaths which form the body of the hose are preformed by extrusion, molding or other means well known to the plastics art of an elastomeric plastic material to an inside diameter which at rest is less than the outside diameter of the reinforcing coil. While the outermost tubular layer or sheath may be of a slightly larger diameter than that of the inner sheaths, it is normally sufficient that all tubular members be of the same diameter. These tubes may be formed of any of the regularly employed elastomeric plastic materials such as rubber, the various synthetic rubbers, or thermoplastic materials such as polyvinyl chloride and the like.

The first of these tubular members; i.e., the member forming the inner portion of the hose body, is applied to the reinforcing coil by first radially expanding or otherwise enlarging the tubular sheath relative to the outside diameter of the coil so that the former becomes diametrically larger than the latter, whereupon the coil may be inserted axially into the tube. This expansion should be at such temperatures and under such conditions that the material of which the tubular member is formed will, at all times during its relative enlargement, be within its elastic limit so that, upon the release of the expansive force, the tube will elastically embrace the coil in seeking to return to the diameter at which such tube was originally formed. As this first or inner tubular member thus elastically embraces the coil, the sheath will become pleated or corrugated; i.e., characterized by alternating crests and troughs longitudinally thereof, with the crests passing over and the troughs spaced between the axially spaced individual turns of the circumferential reinforcement. Ancillary to this corrugation or pleating of the tubular member, the sheath will partially surround each of the individual turns of the reinforcement. Once the inner tubular member is thus released and elastically embraces the coil, the two members are then integrated or joined together either by simple thermal fusion in the case of a reinforcement surface and tubular member of a thermoplastic material or by suitable adhesives or other bonding agents. This integration preferably takes place along the outermost periphery of the reinforcing coil which is just where it is in contact with the inner surface of the inner tubular layer.

Since the reinforcement itself is of a resilient material and since the first tubular member elastically embraces the same, the two components will exert a resilient or elastic counter force upon each other, the reinforcing coil tending to enlarge the tube and the tube tending to restrict the coil. The nature of this interplay of forces is such that, where the reinforcement is in the form of a helical coil, it will become slightly reduced in diameter and shortened from its normal length; i.e., the length at which it was originally preformed and which it had prior to the application of the tubular sheath thereto. To compensate for this reduction in the length of the coil, it may be slightly elongated before the tubular member is released thereon. This pre-stretching of the coil may even be such that, under the influence of the elastic tubular member, the coil will be slightly longer than normal by virtue of being held under slight tension so that any forces applied longitudinally to the finished hose will be absorbed first by the strength material of the coil rather than by the elastomeric material of the hose wall alone.

Once the first or inner tubular member has been thus associated with the reinforcement, the second tubular member may be radially expanded or enlarged relative to the coil in the same manner as that above described for the first tubular member. Within the second tubular member thus expanded, is then positioned the pre-assembly of the coil and the first tubular member; and the second or outer cover tube is then released to elastically embrace this pre-assembly. The outer tubular layer, like the first, will thereupon become pleated or corrugated and partially encircle the individual turns of reinforcing coil from which the cover is of course spaced by at least the thickness of the first tubular layer. The quick release of the second tubular layer upon the pre-assembly will result in the entrapment of a small amount of air between the two tubes at least along the troughs of the corrugations thereof so that the inner and outer tubular members will be separated by an air space of infinitesimal thickness.

It has been found that where the pre-assembly of the inner tube and the reinforcement is positioned loosely or in normal, relaxed position within the second tubular member before the same is released from its expanded condition, an excessive amount of air may be entrapped between the two tubes. While the excess air may subsequently be drained from the hose wall by puncturing the outer tubular layer at points where such air gathers in the form of bumps or blisters, this puncturing provides the beginnings of tears which may grow or enlarge to the ultimate premature failure of the hose. A more convenient expedient for avoiding this entrapment of excessive air has been found to comprise axially elongating the pre-assembly of the reinforcing coil and the first tubular member until the second tubular layer is released upon and elastically embraces the same.

As a result of the particular arrangement and assembly of the components as set forth above, the dimensional stability and the desired corrugation of the hose is maintained by virtue of the integration between the reinforcing coil and the first tubular member. At the same time, since the second tubular layer has no direct association with the pre-assembly other than its mere elastically embracing contact therewith, this cover layer may be said to be slidable over the inner tube, at least in the troughs of the corrugations thereof, with the result that the flexibility of the hose is greatly increased as compared with a hose having a wall thickness equal to the combined thicknesses of the two tubular members. Furthermore, the entrapment of the air between the two tubes serves not only as a cushion or buffer against complete and thorough impregnation of the two walls to the ultimate loss of the fluid imperviousness of the hose, but also as a spacer for these two tubular members so that a rupture or tear of the outer one will not necessarily give rise to a similar rupture or tear through the inner one.

For certain purposes the two-layer member is deemed desirable, but there are occasions where three, four, or more layers are required. Each additional layer may be added by radially expanding the next layer to be added in the same manner as described for the second layer. The previous assembly, consisting of the reinforcement and two or more tubes (depending upon which layer is being added) is positioned within the expanded layer. Each succeeding layer then entraps air between adjacent tubes, just as occurred between the first and second tubes. Further, the relative sliding contact between adjacent layers will occur, just as described between the first and second layers.

The invention thus generally described may be more clearly understood by reference to the following detailed description of certain embodiments thereof in connection with which reference may be had to the appended drawings, in which:

Figure 1 is a perspective view of a mandrel and a helical reinforcement being formed from a continuous resilient strand thereon.

Figure 2 is an elevational view, partially broken away and in partial cross section, showing one means of associating the first tubular member with the reinforcing coil of a conduit manufactured according to the present invention.

Figure 3 is an elevational view, partially broken away and in partial cross section, illustrating schematically one means for integrating the coil and the first tubular member positioned thereon.

Figure 4 is an elevational view, partially broken away and in partial cross section, illustrating the expansion of the second tubular layer and the positioning of the pre-assembly of the first tubular member upon the reinforcing coil therewithin prior to the association of the outer tubular layer therewith.

Figure 5 is an enlarged fragmentary cross-sectional view through a reinforced conduit wall formed according to the present invention.

Figure 6 is a view similar to Figure 5 illustrating a conduit made according to a modified method of this invention.

Referring now to Figure 1, the circumferential reinforcement 10 to be employed in the present invention is shown to be in the process of being formed about a cylindrical forming mandrel 11 which may have a clamp 12 thereon for receiving one end of the strand 13 from which the coil is to be formed. The mandrel 11 may be rotatably driven about the shaft 14 so as to draw the strand 13 thereon, and the strand may be fed upon the mandrel through a tensioning device such as the snubbing bars 15 which may be led by a suitable screw mechanism (not shown). The reinforcement thus formed can be seen to be in the form of a helical coil 10 having an outside diameter equal to the diameter of the mandrel 11 plus twice the diameter of the strand 13 and to comprise a series of axially or longitudinally spaced individual helical turns 16. Once this coil is so preformed, it may be removed from the mandrel and will retain the shape illustrated in Figure 2.

The first tubular member 17 which is extruded or otherwise preformed to have a normal inside diameter which is less than the outside diameter of the preformed coil and is preferably composed of an elastometric, thermoplastic material such as a plasticized polyvinyl chloride is then placed in a vacuum forming device which has a hollow cylindrical body or shell 18 in communication with a conduit or fitting 18 connected to a vacuum pump or other means for evacuating the air therefrom. About the ends of the expander shell 18, the end portions of the tubular member 17 are folded back or "cuffed," so that an air seal is formed about the space defined by the outer surface of the tubular member 17 and the inner surface of the shell 18. As the air is evacuated from this space, atmospheric or other ambient pressures will cause the tube to become radially expanded against the shell interior to the diameter which is larger than the outside diameter of the coil and will allow the coil 10 to be easily inserted therein as shown in Figure 2. Once the coil is thus positioned, the vacuum may be released by simply opening the conduit or fitting 19 or by unfolding the end portions of the tube from around the ends of the shell 18, whereupon the elasticity of the tubular member 17 will cause it to slip from the expander shell and to elastically embrace the coil 10 as illustrated in Figure 3. The nature of this elastic engagement of the tube about the coil is such that the tube will become pleated or corrugated into axially alternating crests 20 and troughs 21, the crests being positioned directly over the individual wire turns 16 and the troughs being positioned between such turns. It will also be observed in Figure 3 that the tubular sheath 17 partially surrounds, encircles or embeds the individual turns 16 against which the tube is exerting a radially inwardly acting elastic force.

Another adjunct of this elastic engagement of the tube 17 about the reinforcement 10 is that, as the tube seeks to collapse radially inwardly, it will tend to pull the individual turns 16 closer together longitudinally of the reinforcement. It is for this reason that, before the tube 17 is released upon the reinforcement, the latter should be elongated to such an extent that, after the elasticity of the tube and the resilence of the coil are in balance and the two components are at rest and in contact with each other as above described, the individual turns or helices 16 will be longitudinally spaced by approximately the same distance as that in which they were originally formed. Although the turns are said to return to their approximate original spacing, it has been found desirable in many instances that they should not completely return to such spacing so that, in effect, the coil or the wire of which the coil is formed will be under slight tension, and any longitudinal forces applied to the finished hose will be absorbed at least in part by the wire rather than solely by the plastic tubular body members. Thus if a finished hose of say eight-and-one-half feet in length, having its individual turns longitudinally spaced by approximately one-fourth of an inch is desired, the coil should be formed in the first instance with such spacing and in a length slightly less than eight-and-one-half feet, say on the order of eight feet. Prior to the application of the tubular sheath 17 thereto however, the coil should be stretched slightly to say approximately ten feet in length so that, as the tube 17 is released upon the coil and the coil is in turn allowed to seek its normal length under the influence of the elastic encirclement of the tube, the coil and the tube thereon will shorten to the desired length of eight-and-one-half feet with the turns being spaced slightly more than the one-quarter of an inch at which they were originally formed.

At this point in the manufacture of conduits according to the present invention, it has been found desirable in certain modifications to effect some fixation or integration between the plastic surface of the wire coil and the inner surface of the tubular member 17. Where the reinforcement is formed as illustrated in Figure 1 of a spring steel wire core 22 as shown in Figure 3 to which a surface layer or coating of plastic such as a plasticized polyvinyl chloride 23 has been applied by extrusion, immersion or other means well known to the wire-coating art, the desired fusion or integration of the reinforcement 10 and the tubular member 17 may be conveniently achieved by simply passing an electric current through the core 22 until the heat resulting from the resistance to the passage of this current will heat the coating 23 to a temperature at which it will become fused or welded to the tube at points where the tube and the coil are in contact as above described. Where both the coating 23 and the inner tubular member 17 are composed of a plasticized polyvinyl chloride compound, it has been found that satisfactory fusion or integration of the coil and the tube may be effected by passing a 220-volt electric current through the core 22 for ten seconds where this core is of a spring steel wire of approximately .051 inch in diameter and forms a fifteen-foot, one-and-one-half-inch inside diameter coil having the turns thereof spaced by approximately one-fourth of an inch. In hoses of the same length and coil spacing but having a one-and-one-quarter-inch inside diameter and employing a spring steel wire of .045 inch in diameter, the 220-volt electric current should pass through the coil for approximately eight seconds. In a hose of the same length and coil spacing but having a one-and-three-quarter-inch inside diameter and employing a .058 inch diameter spring steel wire, the 220-volt current should pass through the same for twelve seconds. Where the coating 23 is on the order of .015 inch in thickness, a firm integration between the coating and the sheath has been effected along all points at which the sheath is in firm contact with the coil upon the application of an electric current as above described. This current may be conveniently provided by any well known means such as the schematically illustrated generator 24 which is connected to the bare ends 25 and 26 of the helical coil 10 by the conductor wires 25a and 26a respectively.

About this pre-assembly 28 of the member 17 and the coil 10 is then positioned the second or outer tubular body member 27 which is also formed by extrusion or otherwise to have an inside diameter which is normally less than the normal outside diameter of the pre-assembly 28. In view of this relatively small diameter of the second or outer tubular body member 27, it also must be radially expanded as for example by the use of the above-described vacuum forming shell 18 before it can be applied to the pre-assembly 28. As shown in Figure 4, this tubular member 27 is folded back over the ends of the shell 18; and, as the air is then evacuated from the shell by means of the conduit 19 connected to a vacuum pump or other air evacuating means, the atmospheric or ambient pressure surrounding the shell 18 will force the tubular member 27 radially outwardly to the inner periphery of the shell whereupon the pre-assembly 28 may be readily inserted. The vacuum may then be quickly released and the outer tubular member allowed to seek to return to the diameter at which it was originally preformed thereby elastically embracing the pre-assembly 28.

The nature of this elastic encirclement of the pre-assembly 28 by the outer tubular member 27 and the general relationship of all of the above-described components is shown in Figure 5 wherein a finished hose or conduit according to the present invention is shown in enlarged cross section. It will be noted that in elastically embracing the pre-assembly 28, this outer sheath 27 also becomes corrugated in a pattern of alternating crests 29 and troughs 30 with the crests 29 overlying and the troughs 30 being positioned between the turns 16. It will also be observed that the outer layer 27 contacts the inner layer 17 only at the points 31 which overlie the reinforcing turns 16. Otherwise the outer member 27 is spaced from the inner member 17 by an air space 32 which varies from zero at the point of contact between the members 17 and 27 to a nominal thickness on the order of from one thirty-second to one sixty-fourth of an inch at the center of the trough. This air space results from the entrapment of air between the two fluid-impervious members 17 and 27 which attends the rapid release of the latter upon the former in the above-described manner. It will also be noted in Figure 5 that there is no affixation or other direct association between the outer and inner tubular members other than their frictional contact resulting from the elastic encirclement of the pre-assembly 28 by the sheath 27.

Where the pre-assembly 28 is positioned loosely within the expanded inner member 27 before the release of the latter, it has been found that excessive air may become entrapped between the two tubular members which will result in objectionable air bubbles or blisters in the finished hose. While these blisters may be eliminated by evacuating the air therefrom by means of a hypodermic needle or the like, this is unsatisfactory insofar as it involves considerable time, introduces a rupture which may form the beginning of a tear and also results in the loss of the air cushion which is desirable from the standpoint of improved hose flexibility and resistance to complete rupture of the hose wall. According to a modification of the present invention therefore, it is taught herein that the pre-assembly 28 should be stretched, similarly in manner and degree to the stretching of the coil 10 in the construction of the pre-assembly, before the outer sheath 27 is released from its expanded condition. In the case of the desired eight-and-one-half-foot hose referred to above, the pre-assembly, which has itself returned to an approximate eight-and-one-half-foot length after the application of the inner member 17, should be again stretched to approximately ten feet so that the radially inwardly acting elastic force of the outer tubular member 27 will again cause the entire hose to shrink back to the desired eight-and-one-half-foot length. When this procedure is followed, a uniform quantity of air is entrapped between the two members which will afford a cushion which will enable the two tubular members to slide relative to each other during hose flexure and will retard a piercing object's complete and destructive penetration of the outer and/or inner tubular members. It has been found in almost all cases that the coil by itself or the pre-assembly of the coil and a tubular sheath thereon should be longitudinally extended to approximately 133% of their normal or preformed length before the application of a subsequent elastically-embracing sheath thereto, if the full effects of the improvements provided by this invention are to be enjoyed.

The foregoing description of the novel method relates to the manufacture of a conduit having only two tubular members, but as has been previously noted, additional members may be added to envelop the assembly thus described. The resulting product is illustrated in Figure 6. In order to take these modified steps, it is only necessary to expand a third sheath or tubular member 33 in the manner illustrated in Figure 4. The vacuum will be released and the member 33 allowed to embrace what is now the intermediate sheath or tubular member 27. As shown in Figure 6, the outer sheath 33 will follow the same corrugated shape that already exists, creating alternating crests 34 and troughs 35. Contact occurs between members 33 and 27 only at points 36 which correspond in an axial direction with turns 16. Otherwise the outer member is spaced from the inner by air space 37 similar to air space 32. As additional sheaths are desired, they will be expanded and released to envelope the assembly in the same manner as just described.

While the above-described procedure involves the radial expansion of the tubular members to allow for the easy insertion of the wire coil or the pre-assembly of the coil and the inner sheath thereon, it can be appreciated that a relative change in the diameters of these components is all that is required; and the same effects may be achieved by reducing or radially contracting the wire coil or the pre-assembly and inserting it within the normally positioned tubular member to be next applied.

While the foregoing invention has been described in considerable detail in connection with certain preferred embodiments thereof, it is to be understood that this particularization and detail have been for the purposes of illustration only and in no way limit the scope of this invention as it is defined in the subjoined claims.

I claim:

1. A method for the manufacture of flexible, fluid-impervious conduits comprising preforming a strand of resilient material into a coil having individual helical turn spaced axially thereof, performing inner and outer tubular body members of an elastomeric material, the normal inside diameter of which members is less than the normal outside diameter of said coil, radially and elastically expanding said inner member to an inside diameter larger than the outside diameter of said coil, inserting the coil within the expanded inner member and allowing the latter to seek its normal diameter thereby embracing said coil and at least partially surrounding the individual turns thereof, integrating said inner member and said coil at points where the inner member is in contact with the coil, radially and elastically expanding said outer member to an inside diameter larger than the ouside diameter of said inner member as it embraces said coil, placing said inner member and said coil thereon within the expanded outer member and releasing the latter and allowing it to seek its normal diameter thereby elastically embracing said inner member and said coil and to entrap air between said inner and outer members.

2. A method for the manufacture of flexible, fluid-impervious conduits comprising preforming a strand of resilient, electrically conductive material having a thermoplastic surface into a coil having individual helical turns spaced axially thereof, preforming inner and outer tubular body members of an elastomeric thermoplastic material, the normal inside diameter of which is less than the normal outside diameter of said coil, radially and elastically expanding said inner member to an inside diameter larger than the outside diameter of said coil, inserting the coil within the expanded inner member and allowing the latter to seek its normal diameter thereby embracing said coil and at least partially surrounding the individual turns thereof, passing an electric current through said strand thereby heating the plastic surface thereof and causing said inner member to become integrated with said coil at points where said member and said coil are in contact, radially and elastically expanding said outer member to an inside diameter larger than the outside diameter of said inner member as it embraces said coil, longitudinally extending said inner member and said coil to substantially 133 percent of the length at which the coil was originally formed, inserting said inner member and said coil within the expanded outer member and quickly releasing the latter from its expanded condition allowing it to seek its normal diameter thereby elastically embracing said inner member and said coil and to entrap air between said inner and outer members.

3. A method for the manufacture of flexible, fluid-impervious conduits comprising preforming a strand of resilient material into a coil having axially spaced individual helical turns, preforming inner and outer tubular body members of an elastomeric material, the normal inside diameter of the inner member being less than the normal outside diameter of the coil and the normal inside diameter of said outer member being less than the outside diameter of said inner member, radially and elastically expanding said inner member to an inside diameter larger than the outside diameter of said coil, slightly elongating said coil and placing it within the expanded inner member, allowing said inner member and said coil to seek to return to the dimensions at which they were originally formed whereby said inner member will elastically embrace said coil and partially surround the individual turns thereof, affixing said inner member to said coil at points where said members are in contact, radially and elastically expanding said outer member to an inside diameter larger than the outside diameter of said inner member as it embraces said coil, elongating said inner member and said coil substantially to the length at which the coil was elongated prior to the application of the inner member thereto, placing said coil and said inner member within the expanded outer member, releasing said outer member from its expanded condition, and releasing said coil and said inner member from their elongated condition.

4. A method according to claim 3 wherein said coil is elongated to approximately 133 percent of the length at which it was originally formed before the inner member is released thereon.

5. A method for the manufacture of flexible, fluid-impervious conduit comprising the steps of preforming a continuous helical reinforcement, preforming an inner and a plurality of additional outer tubular members of elastomeric material, radially enlarging said inner member to an inside diameter larger than the outside diameter of said reinforcement inserting said reinforcement within the enlarged member, releasing said member to allow it to elastically embrace and at least partially surround said reinforcement, integrating said member and said reinforcement at their points of contact to form a subassembly, enlarging the innermost of said outer members and inserting said subassembly therein, releasing said outer member to elastically embrace said subassembly, and similarly enlarging and releasing the other of said outer members in succession in order to provide a finished conduit.

References Cited in the file of this patent

UNITED STATES PATENTS

| | | |
|---|---|---|
| 1,937,069 | Rado | Nov. 28, 1933 |
| 2,204,294 | Blanchard | June 11, 1940 |
| 2,822,857 | Rothermel | Feb. 11, 1958 |

UNITED STATES PATENT OFFICE

CERTIFICATE OF CORRECTION

Patent No. 2,941,571           June 21, 1960

Edward M. Rothermel

It is hereby certified that error appears in the printed specification of the above numbered patent requiring correction and that the said Letters Patent should read as corrected below.

Column 4, line 71, for "18" read -- 19 --; column 7, line 62, for "envelope" read -- envelop --; column 8, line 8, for "performing" read -- preforming --.

Signed and sealed this 31st day of January 1961.

(SEAL)
Attest:

KARL H. AXLINE           ROBERT C. WATSON
Attesting Officer           Commissioner of Patents